Feb. 20, 1934.   R. PUDELKO   1,947,737
ELECTRICITY METER
Filed Sept. 14, 1931   2 Sheets-Sheet 1
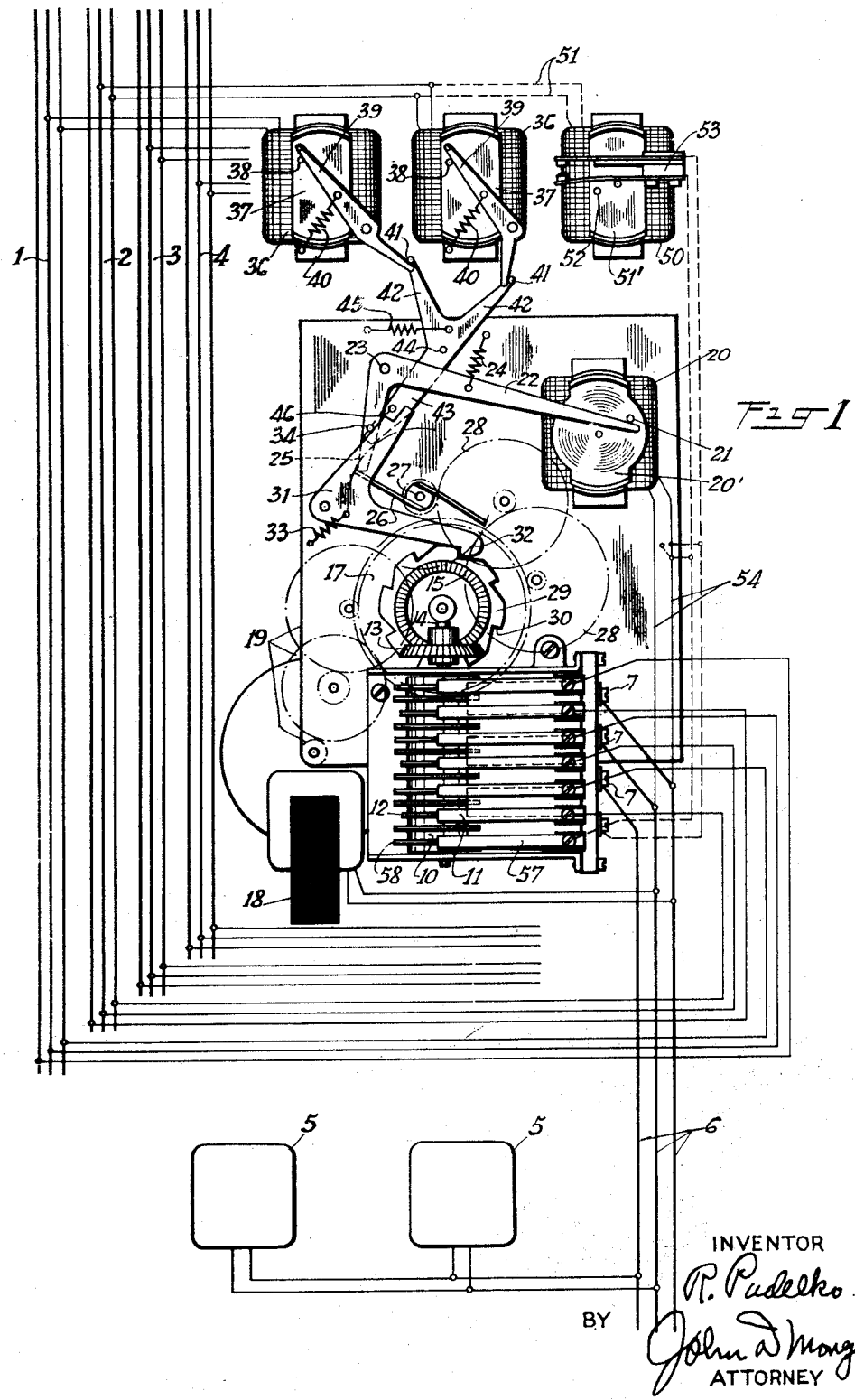

Feb. 20, 1934.  R. PUDELKO  1,947,737
ELECTRICITY METER
Filed Sept. 14, 1931   2 Sheets-Sheet 2
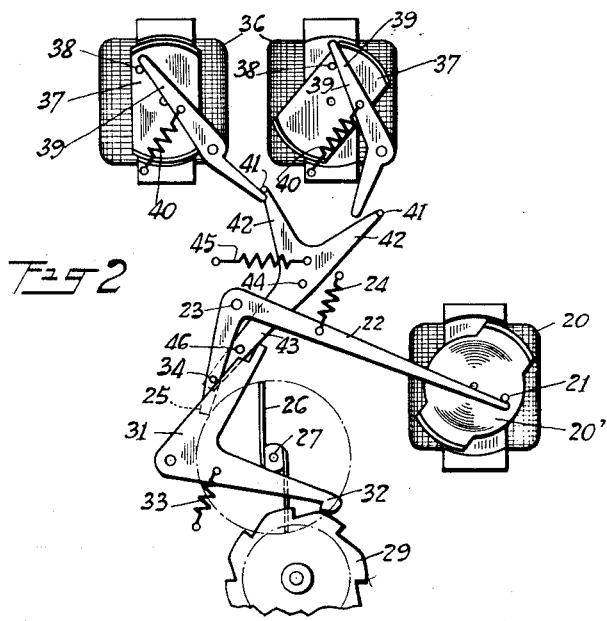
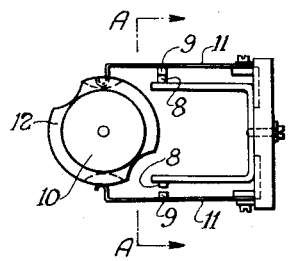
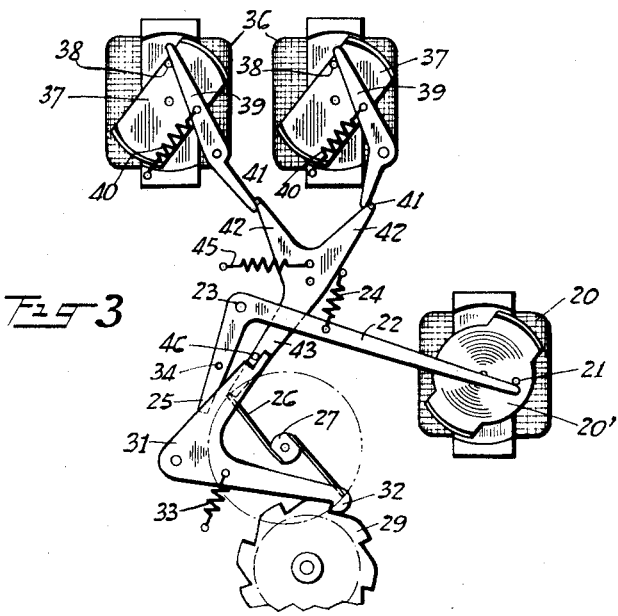
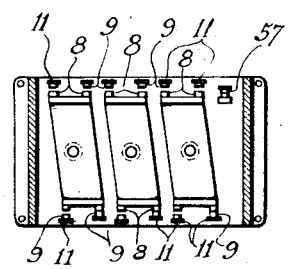
INVENTOR
R. Pudelko
BY John D Morgan
ATTORNEY Patented Feb. 20, 1934

1,947,737

UNITED STATES PATENT OFFICE 1,947,737

ELECTRICITY METER

Riccard Pudelko, Zug, Switzerland, assignor to Landis & Gyr, A-G., a corporation of Switzerland Application September 14, 1931, Serial No. 562,738, and in Switzerland September 20, 1930

5 Claims. (Cl. 171—34)

The present invention relates to electricity meters and more particularly to a novel and improved electrical measuring apparatus adapted to be used in connection with a plurality of main circuits.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1 is a diagrammatic view showing the mechanism of the present invention and the circuit connections therefor;

Figure 2 is a fragmentary plan view showing one stage in the operation of the embodiment illustrated in Figure 1;

Figure 3 is a similar view showing a different stage in the operation;

Figure 4 is a side elevation of the switching mechanism employed in connection with the present invention; and Figure 5 is a section taken on the line A—A of Figure 4.

In electrical installations of the kind now generally employed, it is frequently desirable to effect the registration or summation of the energy flowing in several different circuits at a central station. Such summation meters as are generally employed for this purpose require the provision of some motor means for their actuation, and to insure correct registration, these motor means must be continuously operated so long as current is flowing in any of the circuits to be totalized.

The present invention has for its object the provision of a novel and improved metering mechanism, the driving means of which is adapted to be energized at all times when current is flowing in any of the individual circuits. A further object is the provision of a metering mechanism for use with a plurality of individual circuits, said metering mechanism being provided with means for selectively energizing its motor means from any one of the individual circuits.

Still another object is the provision of sequential switching means, particularly adapted for use with summation meters and other meters operating in conjunction with a plurality of independent circuits, whereby the meter actuating means is maintained in circuit with a live line and is disconnected therefrom and reconnected to another line when the power fails in the first line.

Another object is the provision of selective switching mechanism brought into operation by failure of power in one circuit, which operates to connect the switching mechanism with successive lines until a live line is reached.

In accordance with the present embodiment of the invention, the summation meter, provided with actuating means, is adapted to record or register the total energy flowing in a plurality of individual main circuits. Means are provided for connecting the meter driving means with any one of the plurality of individual circuits and selective switching means are provided to sequentially connect the meter driving means with the various individual circuits, said switching mechanism being brought into operation by failure of the power in the circuit energizing the driving means, and continuing the sequential connection of the driving means until the driving means is connected to one of the live individual circuits. Means are also provided for preventing continued operation of the switching mechanism in case of a failure of power in all of the individual circuits, and other means may be provided for normally maintaining the driving means in circuit with a predetermined one of the individual circuits.

It will be understood that the foregoing general description and the following detailed description as well are exemplary and explanatory of the invention but are not restricted thereon.

In accordance with the present preferred and illustrative embodiment of the invention, as shown in the accompanying drawings, to which reference is made, the summation meters or other meters to be actuated by some resultant of the current or power flowing in all the circuits are designated as 5 and may be of any desired form of construction but are preferably of the type shown and described in Patent No. 1,841,003 of 1932, to Willi Beusch. These meters are connected in the usual manner to a plurality of individual circuits 1, 2, 3 and 4 and the actuating means for said meters are connected to the lines 6, which in turn are connected to terminals 7 for the stationary contacts.

The switching mechanism for connecting the line 6 with one of the main circuits 1, 2, 3 or 4, comprises a plurality of stationary contacts 8 connected together in series of four, (where four main individual circuits are employed) and coacting with movable contacts 9 mounted on individually operable springs 11. Means are also provided for permitting one of each group of movable contacts 9 to contact with its corresponding stationary contact 8, and as embodied, a rotatable drum 10 is provided with cam discs 12 and is rotatably mounted between the outer ends of the spring arms 11. The cam discs 12 corresponding to the various lines of the individual circuits are arranged on the drum 10 so that all of the movable contacts for any one individual circuit are simultaneously moved to closed or open position. As shown in the drawings, the three movable contacts 9 corresponding to the main circuit 2 are closed, and the meters 5 are deriving their power from said main circuit 2.

Means are provided for rotating the selective switching drum 10, to connect the stationary contacts 8 with others of the movable contacts 9 and as embodied a bevel gear 13 is fast to the drum shaft 14 and meshes with a bevel gear 15 which is driven by a spring motor 17. For maintaining the spring motor wound a Ferraris motor 18 is provided which is geared to spring motor 17 by gears 19, motor 18 deriving its power from the line 6. When spring motor 17 is fully wound, the motor 18 is stopped by the overload placed on it.

Lines 6 remain connected to the main circuit 2 so long as energy is flowing in said main circuit, but when the power fails in said circuit, other means are brought into action to reconnect the meters 5 and the Ferraris motor 18 with a live circuit. As embodied, an electro-magnetically actuated relay 20, provided with rotatably mounted armature 20', is held in the position shown in Figure 1 by current supplied to the magnets from lines 6. Spring means (not shown) are provided normally tending to rotate the armature 20' in a counter-clockwise direction (Figure 1), and pin 21, mounted on said armature, coacts with bell crank 22 pivoted at 23 and is held against the pin by spring 24. At its other end 25 bell crank 22 contacts with the vanes 26 of a governor rotatably mounted by shaft 27 and geared to the spring motor 17 by gears 28. So long as current is supplied to relay 20, end 25 is positioned in the path of rotation of vanes 26, thereby preventing movement of the switching drum 10.

Means are also provided for permitting the switching drum 10 to complete its switching operation, and as embodied, bevel gear 15 is provided with a cam 29 having a plurality of dwells 30, one for each switching position of the drum 10. A bell crank 31 is pivotally mounted adjacent to the cam and at one end is provided with a cam follower 32 which is held against the cam by spring 33. At its other end, bell crank 31 contacts with a pin 34 on bell crank 22 and holds end 25 out of the path of the governor vanes 26. At the completion of the switching operation, cam follower 32 moves the bell crank and permits the stop 25 to be moved into the path of the vanes 26, provided armature 20' is in the position shown in Figure 1.

In case the next main circuit (3) is not energized, the relay 20 will remain in a position to hold the stop 25 out of the path of the vanes 26, and cam 29 and drum 10 will continue to rotate until relay 20 and meters 5 are connected with a live main circuit.

Means are also provided for preventing operation of the selective switching means in case power is flowing in none of the main circuits. As embodied, a relay 36 is provided in each of the individual main circuits 1, 2, 3 and 4. Each relay 36 comprises a rotatable armature 37 normally held in the position shown in Figure 1 by current flowing in the magnets of the relay, but moved in a clockwise direction by a spring (not shown). Armatures 37 are provided with stops 38 coacting with levers 39 which are held against the stops by springs 40. The lower ends of the levers 39 coact with pins 41 on the forked ends 42 of the lever 43, which is pivoted at 44 and held against the levers 39 by spring 45. In the present embodiment, for use with four main circuits, two additional relays 36 are provided which are positioned directly in back of those for circuits 1 and 2, and these coact with similar forked ends of the lever 43, these forked ends also being alined with the ends 42 as shown.

At its lower end lever 43 is provided with a pin 46 closely adjacent to the upper end of the bell crank 31, and as the power fails in all of the main circuits, 1, 2, 3 and 4, forked lever 43 is rotated in a counter-clockwise direction so that its lowermost end is positioned in the path of rotation of the governor vanes 26, thereby preventing rotation of the vanes and drum 10, notwithstanding the failure of the power supplied to relay 20.

The upper end of bell crank 31 coacts with pin 46 on fork lever 43 to permit rotation of the drum 10 until cam follower 32 is pressed into one of the recesses 30 of the cam 29, thereby preventing stopping of the switching mechanism with none of the switches in closed position.

Means may be provided, if desired, for returning the switching mechanism to a definite normal position so that the meters are energized by power flowing in a particular main circuit under normal conditions, the remaining circuits being connected to a meter-actuating means only in case of a failure of power in the main circuit. As illustratively shown in the present embodiment, means are provided for normally actuating the meters with energy supplied from main circuit 2, and for this purpose a relay 50 is provided which receives its power from main circuit 2 through lines 51. This relay is also provided with a rotatable armature 51' having mounted thereon a pin 52 which normally closes the switch 53, but maintains the switch in open position when power is supplied to the relay. Switch 53 is placed in series on one side of the line 54 by which relay 20 is connected to line 6, and a second switch is provided in parallel with switch 53 and may also close the circuit to supply power to relay 50. This second switch comprises the contacts 57 controlled by cam disc 58 on drum 10, the dwell of the cam disc 12 closing the switch only when the drum 10 is in a position to connect the lines 6 to circuit 2, at which time switch 53 is held open by power supplied to that relay from circuit 2.

The operation of the present embodiment of the invention described above may be summarized as follows:

In the position shown in Figure 1 of the drawings the apparatus is arranged to supply power to the meter actuating means from main circuit 2 through lines 6. Under such conditions and with power in the remaining circuits 1, 3 and 4, relays 36 are in the position shown and relay 20 maintains stop 25 in the path of governor vanes 26, preventing rotation of the switching drum 10. Switch 53 is in open position as shown, and switch 57 is in closed position completing the circuit to relay 20.

When the power fails in the main circuit 2, relay armature 37 is rotated clockwise, but does not effect any further operation, as forked lever 43 is held in its normal position by the three remaining levers 39. Relay 50 is then also de-energized, closing switch 53, and relay 20 is de-energized, causing stop 25 to be moved out of the path of vanes 26. As soon as the governor vanes 26 are free, spring motor 17 rotates relatively slowly, driving drum 10 and cam discs 12, and this rotation continues until lines 6 are connected to the switching mechanism to main circuit 3. If power for the operation of the meters is available from main circuit 3, relay 20 is energized and spring 24 positions stop 25 in the path of governor vanes 26 as soon as cam follower 32 rides into the next depression of cam 29. At this time the switching mechanism is stopped and power is supplied to the meters 5 from mains 3. In case no power is flowing in circuit 3, the operation is repeated with respect to circuit 4 and if no power is flowing in this circuit the meters are connected with circuit 1.

In case power is flowing in none of the main circuits 1, 2, 3 and 4, all the relays 36 are de-energized, positioning the lower end of forked lever 43 into the path of the governor vanes 26 and thereby preventing actuation of the switching drum 10, notwithstanding the release of stop 25 due to de-energization of relay 20.

As soon as power is restored in circuit 2, switch 53 is open and due to the fact that switch 57 is also open, relay 20 is not energized, and spring motor 17 drives drum 10 until the meters 5 are connected to the switching mechanism through main circuit 2.

In Figure 2 of the drawings the parts are shown in the position assumed by them when the relay 20 is de-energized through failure of power in main circuit 2, while in Figure 3 all of the relays 36 are de-energized and governor vanes 26 are prevented from rotating through the end of fork lever 43 being positioned in their path.

The invention in its broader aspects is not limited to the specific mechanisms shown and described but departures may be made therefrom within the scope of the accompanying claims without departing from the principles of the invention and without sacrificing its chief advantages.

What I claim is:

1. Switching mechanism including in combination several switches for effecting a connection to any one of several main circuits, rotary operating means for sequentially effecting connections with said circuits, control means preventing operation while a connection is made with an active main circuit and means for also preventing operation when all of the main circuits have failed.

2. Switching mechanism including in combination several switches, rotary operating means for opening and closing said switches in sequence, a stop to prevent operation of said switches and means for rendering said stop operative when power can be supplied through none of said switches.

3. Switching mechanism including in combination several switches, rotary operating means for opening and closing said switches in sequence, a stop to prevent operation of said switches, means for releasing said stop when power is not supplied through any of said switches and means for returning said switches to a normal position.

4. Switching mechanism including in combination several switches, operating means for opening and closing said switches in sequence, a stop to prevent operation of said switches, means for rendering said stop operative when power is supplied through one of said switches and means for returning the switches to a definite position except when no power can be supplied through any one of the switches in that position.

5. Switching mechanism including in combination a rotary switching device for alternatively connecting a load to any one of several sources of power, a motor for driving said device, means controlled by failure of power in the source in use for releasing said motor to permit said device to connect the load to an active source, a stop for preventing movement of said switch and means for rendering said stop operative when the power fails in all of said sources.

RICCARD PUDELKO.